United States Patent
Jin et al.

(10) Patent No.: US 11,081,994 B1
(45) Date of Patent: Aug. 3, 2021

(54) SEMICONDUCTOR DEVICE AND MOTOR CONTROL SYSTEM

(71) Applicant: RENESAS ELECTRONICS CORPORATION, Tokyo (JP)

(72) Inventors: Hengquan Jin, Tokyo (JP); Guanyuan Chen, Tokyo (JP); Chengzhe Li, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/796,591

(22) Filed: Feb. 20, 2020

(51) Int. Cl.
*H02P 21/22* (2016.01)
*H02P 21/00* (2016.01)
*H02P 27/08* (2006.01)

(52) U.S. Cl.
CPC .......... *H02P 21/22* (2016.02); *H02P 21/0003* (2013.01); *H02P 27/08* (2013.01)

(58) Field of Classification Search
USPC ......................................................... 318/560
See application file for complete search history.

(56) References Cited

U.S. PATENT DOCUMENTS

| | | | |
|---|---|---|---|
| 7,039,542 B2 * | 5/2006 | Fujii | G01R 31/343 318/727 |
| 10,038,396 B2 | 7/2018 | Watanabe | |
| 2015/0333681 A1 * | 11/2015 | Matsuki | H02P 21/0085 318/400.02 |
| 2016/0028340 A1 * | 1/2016 | Nakai | H02P 21/05 318/400.02 |

FOREIGN PATENT DOCUMENTS

WO 2014/064836 A1 5/2014

* cited by examiner

*Primary Examiner* — Bentsu Ro
(74) *Attorney, Agent, or Firm* — McDermott Will & Emery LLP (57) ABSTRACT

A semiconductor device for vector control of an AC motor via an inverter, includes a dq-axis reference current value generator which generates dq-axis reference current values, a three-phase/two-phase converter which generates dq-axis detected current values from three-phase current values of the inverter and a rotor position of the AC motor, a current controller generates dq-axis reference voltage values by proportional control and proportional integral control based on the dq-axis reference current values, the dq-axis detected current values, a rotation angular speed of the AC motor, and a motor parameter setting value, wherein the integration controller provides an initial voltage value to an integrator before switching to the proportional integral control, and wherein the initial voltage value is based on the dq-axis reference current values, the dq-axis detected current values, the rotation angular speed, the motor parameter setting value, and one of a proportional gain and the dq-axis reference voltage values.

12 Claims, 13 Drawing Sheets

SEMICONDUCTOR DEVICE AND MOTOR CONTROL SYSTEM

BACKGROUND

The present disclosure relates to a semiconductor device, and more particularly to a semiconductor device for controlling a motor and a motor control system.

PWM (Pulse Width Modulation) control using inverters is widely known as a basic control method of an AC motor, for example, a permanent magnet synchronous motor (PM Motor), mounted on an Electric Vehicle (EV), a Hybrid Vehicle (HV), a railway vehicle, or the like. As a torque control method of the AC motor, a vector control method capable of controlling a current of a magnetic flux axis (d-axis) and a current of a torque axis (q-axis) independently of each other is generally used.

In the vector control, the current flowing on the rotational coordinate (the d-axis is defined in the direction of the magnetic flux of the permanent magnet incorporated in the AC motor, and the q-axis is defined in the direction 90 degrees ahead of the d-axis) is controlled to have a desired value. Feedback control by proportional control (also referred to as P control), integral control (also referred to as I control), and proportional integral control (also referred to as PI control) is used for this current control.

Patent Document 1 describes techniques for sine wave PWM-control, vector control, and PI control for AC motors.

PRIOR-ART DOCUMENT

Patent Document

[Patent Document 1] International Patent Application Publication No. WO 2014/064836

SUMMARY

In AC motor control using an inverter, sine wave PWM control or overmodulation PWM control is usually used. In the sine wave PWM control and the overmodulation PWM control, both the magnitude and the phase of the voltage vector can be controlled. The fact that the magnitude and phase of the voltage vector can be controlled means that PI control for independently controlling the d-axis (magnetic flux axis) current and the q-axis (torque axis) current on the rotational coordinates can be applied. However, although the sine wave PWM control and the overmodulation PWM control are effective when the AC motor rotates at a low or medium speed, they are not suitable when the AC motor rotates at a high speed and the output voltage of the inverter is saturated. This is because the output voltage of the inverter is saturated with the maximum voltage that can be output by the inverter when the AC motor rotates at high speed. Therefore, when the AC motor rotates at a high speed, rectangular wave control is used. In the case of the rectangular wave control, since only the phase of the voltage vector can be controlled, it is difficult to apply the PI control, and it is necessary to switch the control system to either the voltage phase control method or the P control method.

As described above, by switching the control method according to the rotation speed of the AC motor, the output torque of the AC motor can be stabilized. The PI control is performed when the AC motor rotates at a low or medium speed, and the P control is performed when the AC motor rotates at a high speed. However, if the method of current control is suddenly switched, shock such as a sudden jump of current or vibration of rotation speed may occur. In particular, when the control method is switched from the P control to the PI control, the response of the integration calculation of the PI control is delayed, so that a shock is apt to occur.

Other objects and novel features will become apparent from the description of the specification and drawings.

A semiconductor device for vector control of an AC motor via an inverter, includes a dq-axis reference current value generator which generates dq-axis reference current values, a three-phase/two-phase converter which generates dq-axis detected current values from three-phase current values of the inverter and a rotor position of the AC motor, a current controller generates dq-axis reference voltage values by proportional control and proportional integral control based on the dq-axis reference current values, the dq-axis detected current values, a rotation angular speed of the AC motor, and a motor parameter setting value, wherein the integration controller provides an initial voltage value to an integrator before switching to the proportional integral control, and wherein the initial voltage value is based on the dq-axis reference current values, the dq-axis detected current values, the rotation angular speed, the motor parameter setting value, and one of a proportional gain and the dq-axis reference voltage values.

The semiconductor device for motor control in one embodiment can reduce shocks when the motor is switched from proportional control to proportional-integral control.

DETAILED DESCRIPTION

Hereinafter, a semiconductor device according to an embodiment will be described in detail by referring to the drawings. In the specification and the drawings, the same or corresponding form elements are denoted by the same reference numerals, and a repetitive description thereof is omitted. In the drawings, for convenience of description, the configuration may be omitted or simplified. Also, at least some of the embodiments may be arbitrarily combined with each other.

First Embodiment

Figure 1:
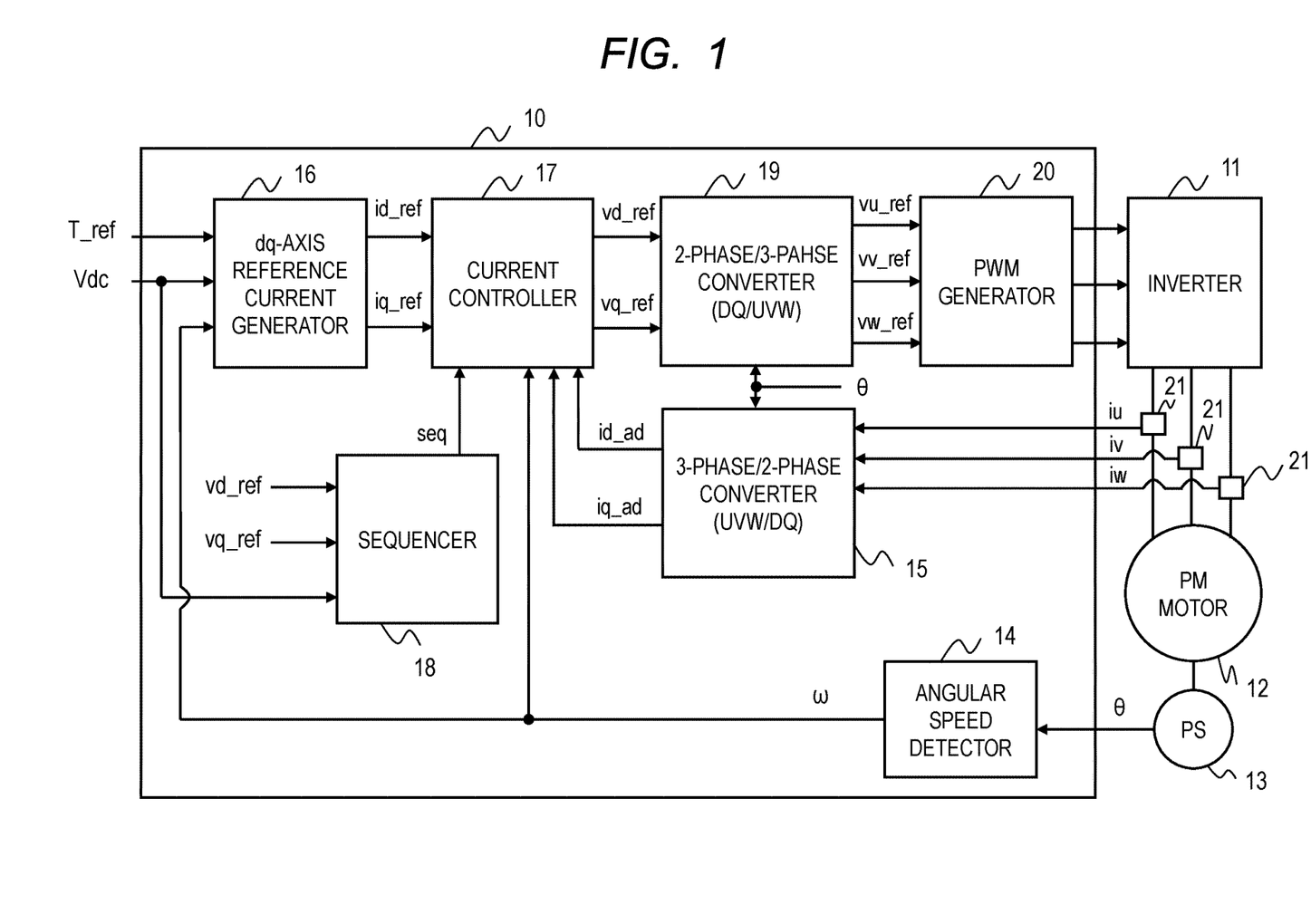
FIG. 1 is a schematic diagram of a motor control system of first embodiment.

FIG. 1 is a block diagram showing a configuration of a motor control system of first embodiment.

As shown in FIG. 1, a semiconductor device 10 controls a PM (Permanent Magnet) motor 12 via an inverter 11. Semiconductor device 10 includes an angular speed detector 14, a three-phase/two-phase converter 15, a dq-axis reference current generator 16, a current controller 17, a sequencer 18, a two-phase/three-phase converter 19, and a PWM generator 20.

The PWM generator 20 is connected to the inverter 11. The inverter 11 is connected to the PM motor 12. The PS (Position Sensor) 13 is connected to the PM motor 12. The angular speed detector 14 is connected to the PS 13. The current detector 21 is connected to the inverter 11.

The PM motor 12 is a motor using permanent magnets. The PS is a position sensor capable of detecting a rotational position θ of a rotor of the PM motor 12, which sensor is also referred to as a rotating magnetic pole position or a rotor position. The angular speed detector 14 calculates the rotational angular speed ω from the rotational position θ.

The inverter 11 is formed of a power MOS transistor or the like. The inverter 11 receives the PWM signal from the PWM generator 20, and generates three-phase PWM voltages for driving the PM motor 12.

The three-phase/two-phase converter 15 converts three-phase alternating current values iu, iv, iw obtained from the current detector 21 connected to the inverter 11, based on the rotational position θ obtained from the PS 13, to two-phase detected direct current values id_ad, iq_ad on the dq axis.

The dq-axis reference current generator 16 generates a dq-axis reference current values id_ref, iq_ref for generating a required torque by the PM motor 12 based on a reference torque T_ref sent from an application which controls the PM motor 12, the direct current bus voltage Vdc of the inverter 11 and the rotation angular speed ω of the PM motor 12.

The current controller 17 generates the dq-axis reference voltage values vd_ref, vq_ref based on the dq-axis reference current values id_ref, iq_ref, the dq-axis two-phase detected direct current values id_ad, iq_ad, the rotation angular speed ω and the control signal seq from the sequencer 18 (described later). The current controller 17 is composed of a current adjuster for suppressing a deviation between the dq-axis reference current values and the dq-axis two-phase detected direct current values, and a non-intervention controller for canceling the intervening voltage between dq axes of PM motor 12. Details will be described later.

The sequencer 18 determines whether the output voltage of the inverter 11 is saturated or not, based on the dq-axis reference voltage values vd_ref, vq_ref and the direct bus voltage Vdc (or a modulation factor) of the inverter 11. The determination result is output as the control signal seq. Details will be described later.

The two-phase/three-phase converter 19 converts the dq-axis reference voltage values vd_ref and vq_ref into three-phase AC reference voltage values vu_ref, vv_ref, and vw_ref based on the rotational position θ.

The PWM generator 20 generates PWM signals for driving the inverter 11 based on the three-phase AC reference voltage values vu_ref, vv_ref, and vw_ref. Specifically, the PWM generator 20 generates a carrier signal using a built-in PWM timer, and compares the carrier signal with the three-phase AC reference voltage values to generate the PWM signals. The generated PWM signals are supplied to gates of the power MOS transistors included in the inverter 11.

Figure 2:
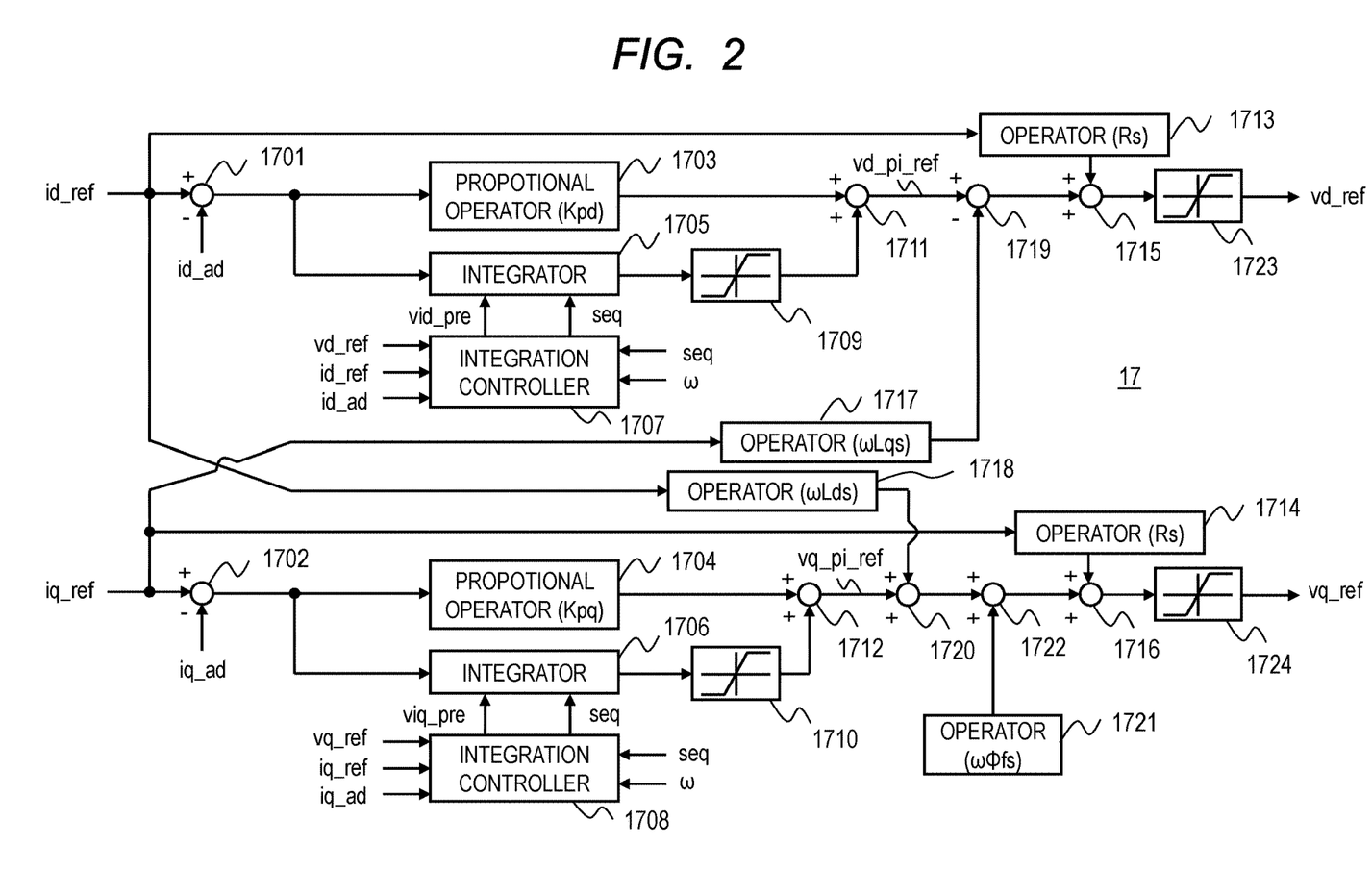
FIG. 2 is a schematic diagram of the current controller of first embodiment.

Next, the details of the current controller 17 will be described. FIG. 2 is a block diagram showing a configuration of the current controller 17. The current controller 17 includes subtractors 1701, 1702, 1719, proportional operators 1703, 1704, integrators 1705, 1706, integration controllers 1707, 1708, limiters 1709, 1710, 1723, 1724, adders 1711, 1712, 1715, 1716, 1720, 1722, and operators 1713, 1714, 1717, 1718, 1721. In this case, when there is an input signal, the operator multiplies the input signal by a predetermined parameter. When there is no input signal, the operator outputs the parameter as it is.

The operators 1717, 1718, and 1721, the subtractor 1719, and the adders 1720 and 1722 constitute the non-interference controller. The subtractors 1701 and 1702, the proportional operators 1703 and 1704, the integrators 1705 and 1706, the integration controllers 1707 and 1708, the limiters 1709 and 1710, and the adders 1711 and 1712 constitute the current adjuster. The proportional operators 1703 and 1704 perform proportional control. Kpd and Kpq are proportional gains. The integrators 1705 and 1706 perform integration control. The proportional-integral control operates the proportional operators 1703 and 1704 and the integrators 1705 and 1706 simultaneously.

When the current controller 17 shown in FIG. 2 is expressed by a voltage equation, the following equation is obtained. In order to simplify the description, it is assumed that the output voltage from the subtractor 1701, the proportional operator 1703, and the integrator 1705 is vd_pi_ref. The output voltage from the subtractor 1702, the proportional operator 1704, and the integrator 1706 is represented by vq_pi_ref. The operation of the limiters 1709, 1710, 1723, and 1724 is omitted.

$$\begin{bmatrix} vd\_ref \\ vq\_ref \end{bmatrix} = \begin{bmatrix} Rs & -\omega Lqs \\ \omega Lds & Rs \end{bmatrix} \begin{bmatrix} id\_ref \\ iq\_ref \end{bmatrix} + \begin{bmatrix} 0 \\ \omega \Phi fs \end{bmatrix} + \begin{bmatrix} vd\_pi\_ref \\ vq\_pi\_ref \end{bmatrix} \quad \text{(Equation 1)}$$

In equation 1, Rs is a winding resistance set value, Φfs is an armature flux linkage set value, Lds, Lqs are dq-axis inductance set values. The values of Rs, Φfs, Lds, and Lqs are set in advance in semiconductor device 10 in accordance with a winding resistances R, an armature flux linkage Φf, and dq-axis inductances Ld, Lq of the PM motor 12, and do not necessarily coincide with the actual values of Rs, Φfs, Lds, and Lqs. Rs, Lds, and Lqs are also referred to as motor parameter setting values.

Assuming that the output voltages of the proportional operators 1703 and 1704 are vd_p and vq_p, and the output voltages of the integrators 1705 and 1706 are vd_i and vq_i, the following equation is obtained.

$$\begin{bmatrix} vd\_pi\_ref \\ vq\_pi\_ref \end{bmatrix} = \begin{bmatrix} vd\_p \\ vq\_p \end{bmatrix} + \begin{bmatrix} vd\_i \\ vq\_i \end{bmatrix} \quad \text{(Equation 2)}$$

On the other hand, the voltage equation in the dq-axis rotation coordinate system of the PM motor 12 is as follows.

$$\begin{bmatrix} vd \\ vq \end{bmatrix} = \begin{bmatrix} R + pLd & -\omega Lq \\ \omega Ld & R + pLq \end{bmatrix} \begin{bmatrix} id\_ad \\ iq\_ad \end{bmatrix} + \begin{bmatrix} 0 \\ \omega \Phi f \end{bmatrix} \quad \text{(Equation 3)}$$

In equation 3, vd and vq are dq-axis voltages, and p is a differential operator. Equation 3 is generally known as vector control of the PM motor, and therefore detailed description thereof is omitted.

Semiconductor device 10, that is, the current controller 17 performs control such that id_ref=id_ad and iq_ref=iq_ad.

Figure 3:
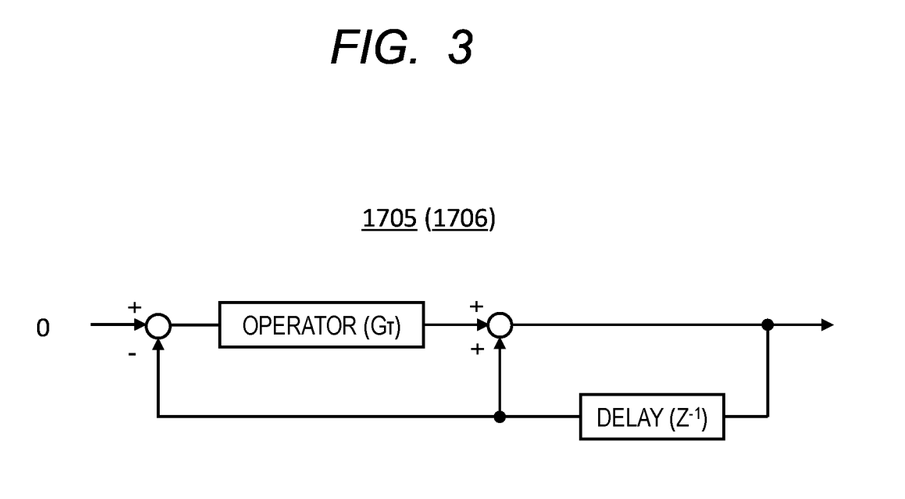
FIG. 3 is a diagram of the integrator of first embodiment.
Figure 4:
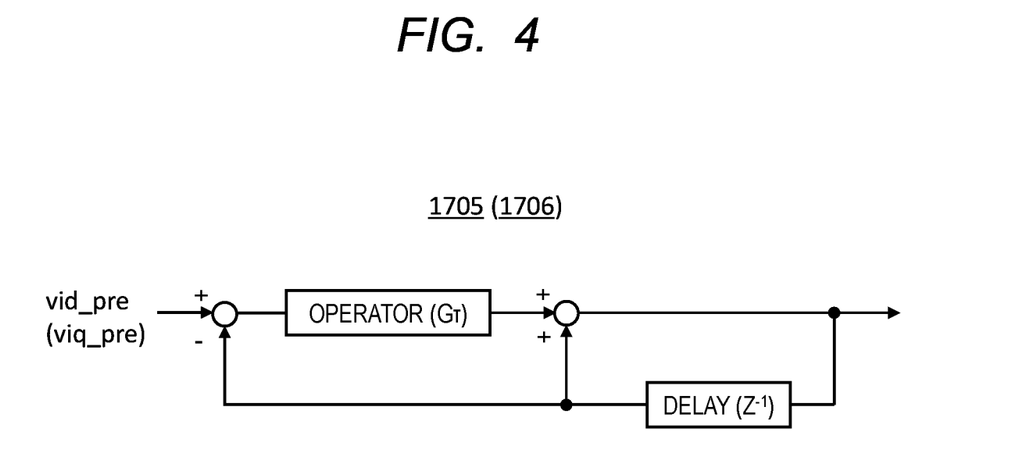
FIG. 4 is a schematic diagram of the integrator of first embodiment.
Figure 5:
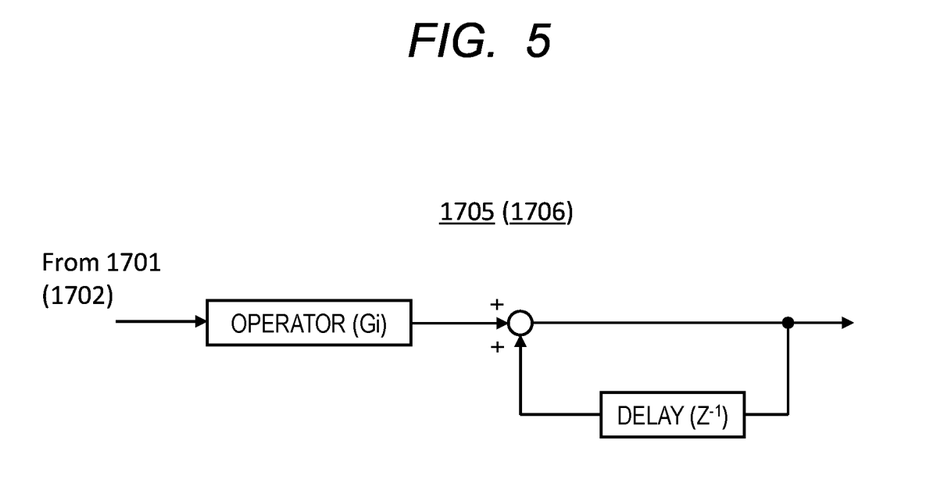
FIG. 5 is a diagram of the integrator of first embodiment.

FIGS. 3-5 are block diagrams showing the configuration of integrators 1705 and 1706. The integrators 1705 and 1706 have any of the configurations shown in FIGS. 3 to 5 according to the output signal seq of the sequencer 18. GT denotes a low-pass filter gain, $Z^{-1}$ denotes a delay element, and Gi denotes an integration gain. Details will be described later.

Figure 6:
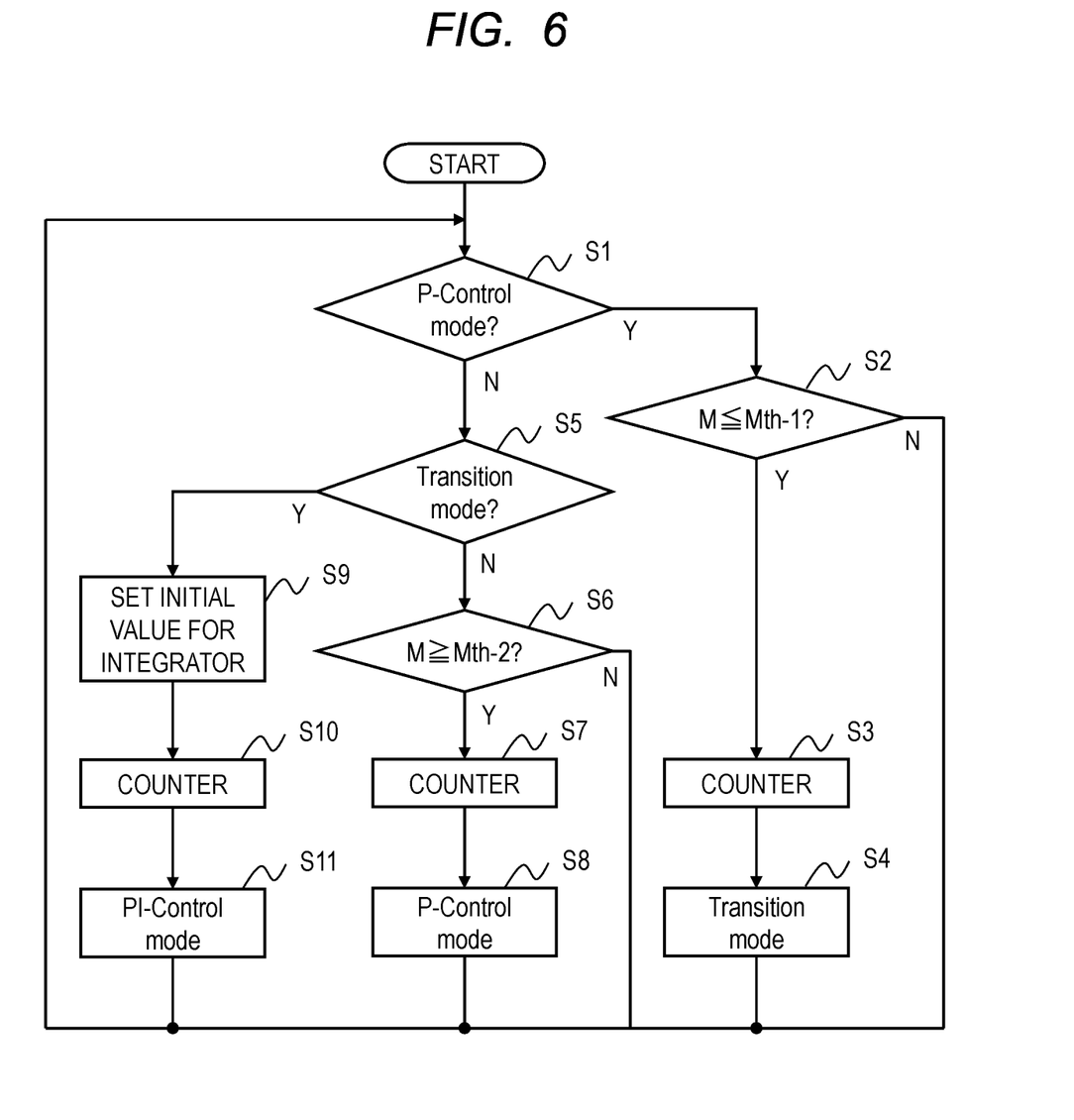
FIG. 6 is a flow chart for explaining the operation of the motor control system of first embodiment.

Next, a basic operation of semiconductor device 10 will be described. FIG. 6 is a flow chart for explaining the operation of semiconductor device 10.

When the PM motor 12 is controlled by sin wave PWM or overmodulated PWM (when first rotation speed: the low-medium speed rotation), the semiconductor device 10 performs the PI control. When the PM motor is controlled by the square wave control (second rotation speed: high speed rotation), the semiconductor device 10 performs the P control. In this first embodiment, whether the PM motor 12 is controlled by the sine wave PWM (or overmodulated PWM) or the square wave control is determined by a modulation factor M.

The modulation factor M will be described. First, the maximum possible effective value Vuv_rms_max between output lines of the inverter 11 is indicated by the following equation when the direct bus voltage of the inverter 11 is Vdc.

$$Vuv\_rms\_max = \sqrt{6}/\pi Vdc \quad \text{(Equation 4)}$$

The relationship between the line voltage Vuv_rms of the inverter 11 and the dq-axis reference voltage values vd_ref and vq_ref is expressed by the following equation.

$$Vuv\_rms = \sqrt{vd\_ref^2 + vq\_ref^2} \quad \text{(Equation 5)}$$

The modulation factor M is obtained by the following equation.

$$M = Vuv\_rms/Vdc \quad \text{(Equation 6)}$$

When the PM motor 12 is at high speed rotation (P control), the modulation factor is Mp. When the PM motor 12 is at low speed rotation (PI control), the modulation factor is Mpi. In this case, Mp>Mpi. Therefore, whether the PM motor 12 is P-controlled or PI-controlled can be determined based on the modulation rate.

Returning to FIG. 3, the operation of semiconductor device 10 will be described. Here, it is assumed that semiconductor device 10 shifts from the P control mode in which the PM motor 12 is controlled by the P control to the PI control mode in which the PM motor 12 is controlled by the PI control. In the P control mode, the integrators 1705 and 1706 do not operate. In the P control mode, the integrators 1705 and 1706 are configured as shown in FIG. 3. That is, the input voltages of the integrators 1705 and 1706 are set to 0.

First, the sequencer 18 determines whether or not semiconductor device 10 is in the P control mode (step S1: Y). Next, in step S2, the sequencer 18 determines whether or not the modulation factor M is equal to or less than a predetermined value Mth-1. The Mth-1 value may be determined in advance by a modulation factor in which the PM motor 12 can be controlled by PI control.

If the modulation factor M is equal to or less than the predetermined value Mth-1, the sequencer 18 waits for a predetermined period of time to elapse (step S3). After the predetermined period of time has elapsed, the sequencer 18 outputs a signal seq for setting semiconductor device 10 to a transition mode (step S4). Semiconductor device 10 returns to step S1.

When semiconductor device 10 enters the transition mode (N in step S1, Y in step S5), the integration controller 1707 generates an initial voltage value vid-pre for the integrator 1705 (step S9). The integration controller 1706 also generates an initial voltage value, viq_pre, for the integrator 1706. The method of generating the initial voltage values vid_pre and viq_pre will be described later.

In the transition mode, the integrators 1705 and 1706 are configured as shown in FIG. 4. That is, the input voltage of the integrator 1705 is set to the initial voltage value vid_pre subjected to a low-pass filter (GT) process. Similarly, the input voltage of the integrator 1706 is set to the initial voltage value viq_pre subjected to the low-pass filtering process. The low-pass filter is composed of a first-order filtering, but may be composed of a second-order or higher-order filtering.

After that, when a predetermined time has elapsed (step S10), the sequencer 18 outputs a signal seq for setting the PI mode (step S11). In the PI mode, the integrators 1705 and 1706 are configured as shown in FIG. 5. The input voltage of the integrator 1705 is switched from the initial voltage value vid_pre to the output of the subtractor 1701, that is, the deviation between the reference current value id_ref and the detected current value id_ad. That is, the integrator 1705 is a normal integrator. The same applies to the integrator 1706. Thereafter, semiconductor device 10 enters the PI-control mode.

As described above, when shifting from the P control mode to the PI control mode, semiconductor device 10 is characterized in that the initial voltage values vid_pre and viq_pre are set to the input voltages of the integrators 1705 and 1706 before shifting to the PI control.

Next, the transition of semiconductor device 10 from the PI control mode to the P control mode will be described. The sequencer 18 determines whether or not semiconductor device 10 is in the PI-control mode (step S1: N, step S5: N). In operation S6, the sequencer 18 determines whether the modulation factor M is equal to or greater than a predetermined modulation factor Mth-2. Mth-2 value may be determined in advance by a modulation factor in which the PM motor 12 can be controlled by the P control mode.

If the modulation factor M is equal to or greater than the predetermined modulation factor Mth-2, the sequencer 18 waits for a predetermined period of time to elapse in operation S7. In operation S8, the sequencer 18 outputs a signal seq for setting semiconductor device 10 to the P control mode. Semiconductor device 10 returns to S1.

When semiconductor device 10 is in the P control mode, the integrators 1705 and 1706 do not operate. In the P control mode, the integrators 1705 and 1706 are configured as shown in FIG. 3. The input voltages of the integrators 1705 and 1706 are set to 0.

Here, the initial voltage values vid_pre and viq_pre will be described. As described above, semiconductor device 10 performs control such that id_ref=id_ad and iq_ref=iq_ad. Suppose that the turning speed of the PM motor 12 is constant and that the dq-axis two-phase detected direct current values id_ad and iq_ad are in an equilibrium state that follows the reference current values id_ref and iq_ref. In the equilibrium state, the output voltages of the proportional operators 1703 and 1704 are 0. The element to which the differential operator p of the equation 3 is applied can be approximated to 0. Also, Rs=R can be approximated. This is because the winding resistance R of the PM motor 12 changes depending on the temperature, but the winding resistance set value Rs can be adjusted based on the temperature detected by a temperature sensor (not shown). At this time, the following equation is obtained from the equations 1, 2, and 3.

$$\begin{bmatrix} vd\_i \\ vq\_i \end{bmatrix} = \omega \begin{bmatrix} 0 & (Lqs-Lq) \\ (Ld-Lds) & 0 \end{bmatrix} \begin{bmatrix} id\_ref \\ iq\_ref \end{bmatrix} + \omega \begin{bmatrix} 0 \\ (\Phi f - \Phi fs) \end{bmatrix} \quad \text{(Equation 7)}$$

Referring to equation 7, it can be seen that the output voltages of the integrators 1705 and 1706 are induced voltages due to the difference between the dq-axis inductances Ld and Lq of the PM motor 12 and the dq-axis inductance set values Lds and Lqs of semiconductor device 10, and the difference between the armature flux linkage Φf of the PM motor 12 and the armature flux linkage set value Φfs of semiconductor device 10.

Next, it is assumed that semiconductor device 10 is operating under P control mode. Assuming that the output voltages of the integrators 1705 and 1706 are 0 in the equations 1 and 2, the following equation is obtained.

$$\begin{bmatrix} vd\_ref \\ vq\_ref \end{bmatrix} = \begin{bmatrix} Rs & -\omega Lqs \\ \omega Lds & Rs \end{bmatrix} \begin{bmatrix} id\_ref \\ iq\_ref \end{bmatrix} + \begin{bmatrix} 0 \\ \omega \Phi fs \end{bmatrix} + \begin{bmatrix} vd\_p \\ vq\_p \end{bmatrix} \quad \text{(Equation 8)}$$

The output voltages of the proportional operators 1703 and 1704 are expressed by the following equation using a proportional gain.

$$\begin{bmatrix} vd\_p \\ vq\_p \end{bmatrix} = \begin{bmatrix} Kpd & 0 \\ 0 & Kpq \end{bmatrix} + \begin{bmatrix} id\_ref - id\_ad \\ iq\_ref - iq\_ad \end{bmatrix} \quad \text{(Equation 9)}$$

When the equations 3, 8 and 9 are transformed in consideration of the equilibrium state, the following equation is obtained.

$$\begin{bmatrix} \frac{iq\_ref}{iq\_aq} & 0 \\ 0 & 1 \end{bmatrix} \left\{ \begin{bmatrix} Rs+Kpd & -\omega Lqs \\ \omega Lds & Rs+Kpq \end{bmatrix} \begin{bmatrix} id\_ref - id\_ad \\ iq\_ref - iq\_ad \end{bmatrix} \right\} = \\ \omega \begin{bmatrix} 0 & (Lqs-Lq) \\ (Ld-Lds) & 0 \end{bmatrix} \begin{bmatrix} id\_ref \\ iq\_ref \end{bmatrix} + \omega \begin{bmatrix} 0 \\ (\Phi f - \Phi fs) \end{bmatrix} + \\ \begin{bmatrix} 0 & 0 \\ -\omega(Ld-Lds) & 0 \end{bmatrix} \begin{bmatrix} id\_ref - id\_ad \\ 0 \end{bmatrix} \quad \text{(Equation 10)}$$

Since the d-axis inductance Ld has a smaller variation range due to magnetic saturation than the q-axis inductance Lq, the difference between Ld and the d-axis inductance set value Lds can be approximated to 0. Therefore, the third term on the right side of the equation 10 can be approximated to 0.

Here, when the equation 7 and the equation 10 after the approximation are compared, it is understood that the right side of the equation 7 and the right side of the equation 10 are the same. That is, when the PM motor 12 is in an equilibrium state by the P control, the voltage value obtained on the left side of the equation 10 can be approximated to the output voltages of the integrators 1705 and 1706. In other words, when switching from the P control to the PI control, the voltage value obtained on the left side of the equation 10 can be used as the initial voltage value of the integrators 1705 and 1706. Since there is no factor (Ld, Lq, Of) attributable to the PM motor 12, the left side of the equation 10 can be calculated by the set values (Rs, Kpd, Kpq, Lds, Lqs) of semiconductor device 10, the dq-axis reference current values id_ref, iq_ref, and the measurement values (id_ad, iq_ad, ω).

Therefore, in the present first embodiment, the initial voltages vid_pre and viq_pre of the integrators 1705 and 1706 at the time of shifting from the P control mode to the PI control mode are set as the following equation.

$$\begin{bmatrix} vid\_pre \\ viq\_pre \end{bmatrix} = \begin{bmatrix} \frac{iq\_ref}{iq\_aq} & 0 \\ 0 & 1 \end{bmatrix} \left\{ \begin{bmatrix} Rs+Kpd & -\omega Lqs \\ \omega Lds & Rs+Kpq \end{bmatrix} \begin{bmatrix} id\_ref - id\_ad \\ iq\_ref - iq\_ad \end{bmatrix} \right\} \quad \text{(Equation 11)}$$

Figure 7:
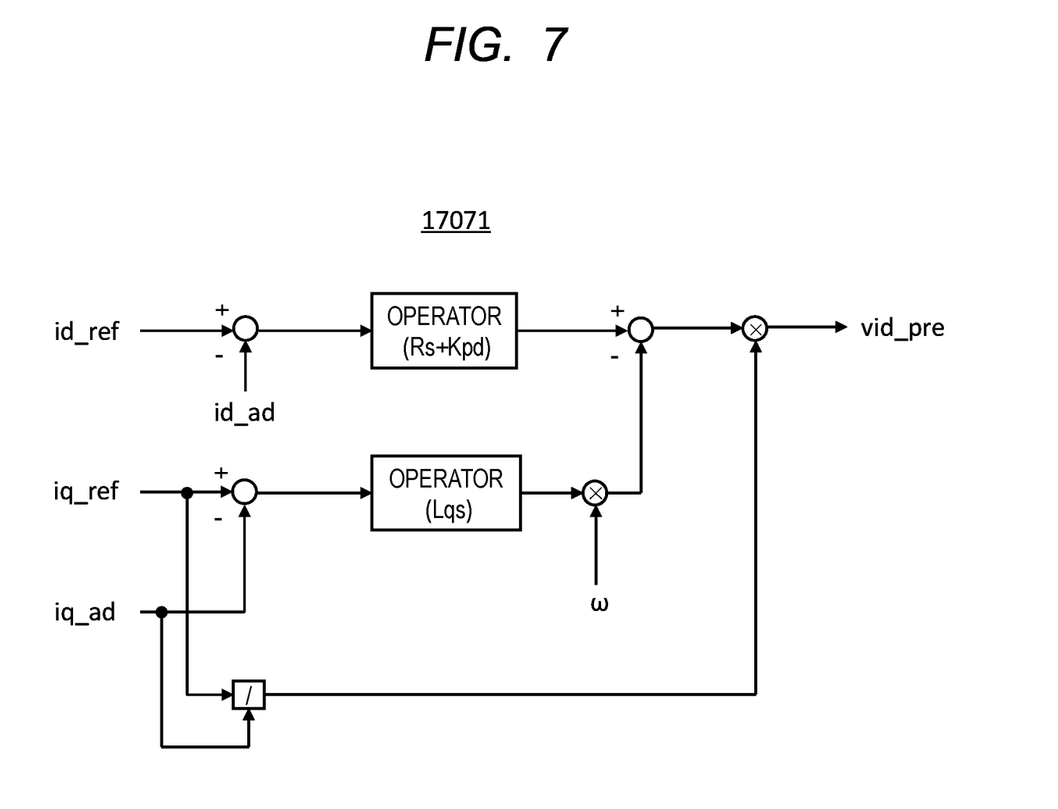
FIG. 7 is a diagram of the integration controller of first embodiment.
Figure 8:
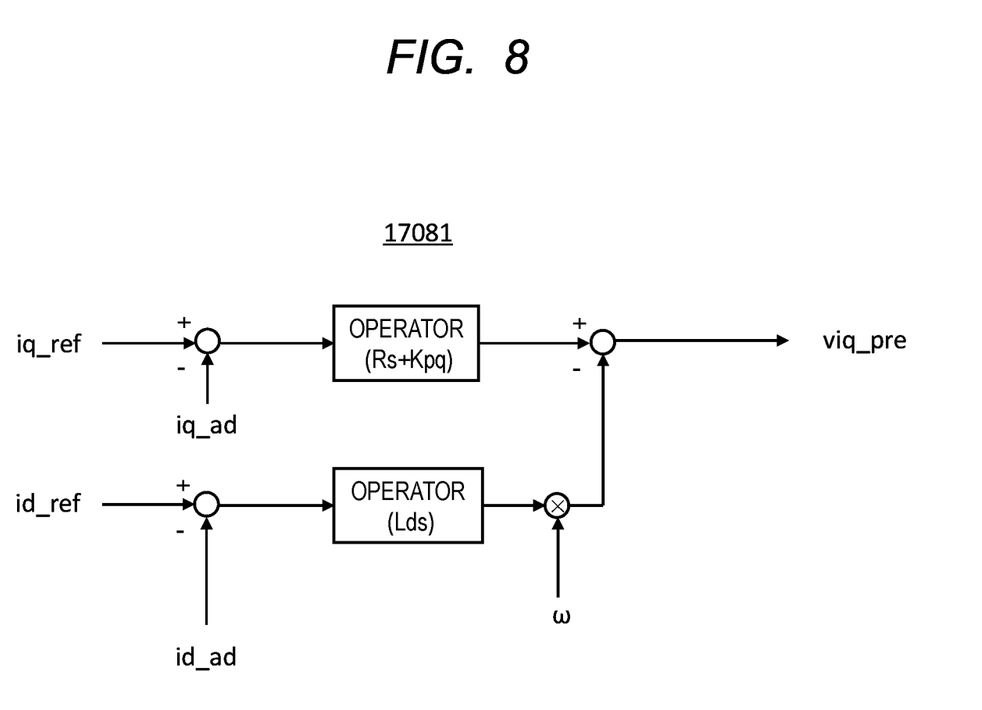
FIG. 8 is a diagram of the integration controller of first embodiment.

FIG. 7 shows an initial voltage vid_pre generator 17071 included in the integration controller 1707. FIG. 8 shows an initial voltage viq_pre generator 17081 included in the integration controller 1708. FIGS. 7 and 8 are based on the equation 11.

Note that the dq-axis two-phase detected current values id_ad and iq_ad include low-order high-frequency components such as 5 or 7 times the basic wave component, so it is desirable to calculate the initial voltages vid_pre and viq_pre with the current value obtained by performing filtering process on id_ad and iq_ad.

Semiconductor device 10 may be composed of dedicated circuits, or may be composed of software. Semiconductor device 10 includes a CPU and a memory, and the CPU executes programs on the memory. This program realizes the functions of the angular velocity detector 14, the three-phase/two-phase converter 15, the dq-axis reference current value generator 16, the current controller 17, the sequencer 18, the two-phase/three-phase converter 19, and the PWM generator 20.

Figure 9:
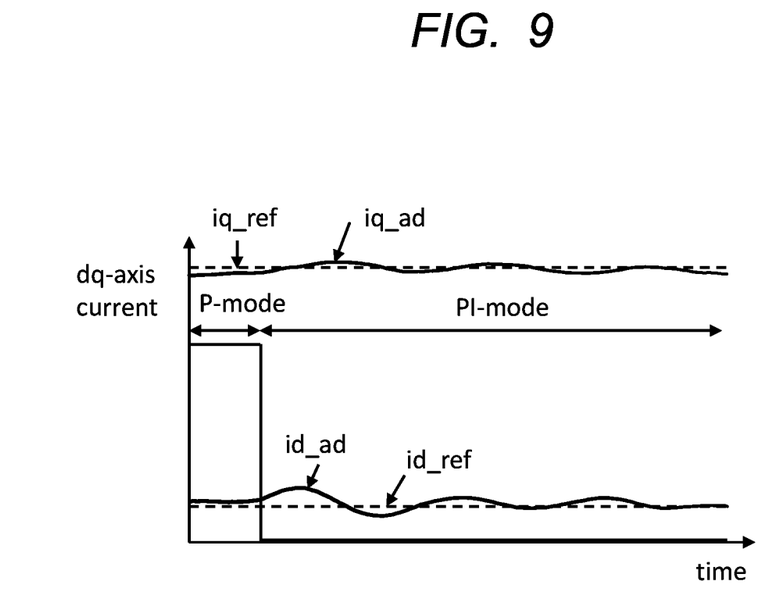
FIG. 9 is a diagram for explaining the effects of the motor control system of first embodiment.
Figure 10:
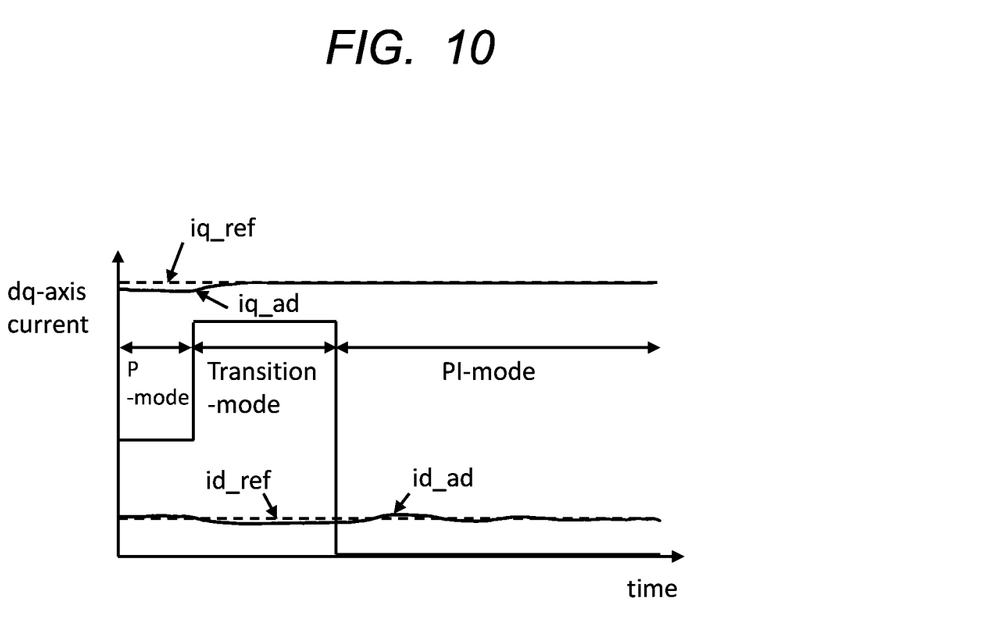
FIG. 10 is a diagram for explaining the effects of the motor control system of first embodiment.

As described above, when shifting from the P control to the PI control, semiconductor device 10 sets the initial voltage values vid_pre and viq_pre to the input voltages of the integrators 1705 and 1706 prior to shifting to the PI control. This makes shock less likely to occur after switching to PI control. FIG. 9 shows the change in the dq-axis reference current values id_ref, iq_ref and the dq-axis two-phase detected current values id_ad, iq_ad in the conventional technique. Figure shows the changes in the dq-axis reference current values id_ref, iq_ref, and the dq-axis two-phase detected current values id_ad and iq_ad in present embodiment 1. Comparing FIG. 9 and FIG. 10, it can be seen that the current variation is smaller in this first embodiment when the PI control mode (PI-mode) is shifted from the P control mode (P-mode). In the prior art, when switching to PI control, the initial voltage values of the integrators 1705 and 1706 are set to 0, for example. However, when the initial voltage value is set to 0, the response of the integrators 1705 and 1706 is delayed, so that a shock such as a current variation is liable to occur.

Second Embodiment

Second embodiment has the same configuration as that of semiconductor device 10. The difference from first embodiment is the configuration of the initial voltage vid_pre generator and the initial voltage viq_pre generator included in the integration controllers 1707 and 1708.

When the right side of the equation 11 is transformed using the equations 8 and 9, the following equation is obtained.

$$\begin{bmatrix} \text{vid\_pre} \\ \text{viq\_pre} \end{bmatrix} = \begin{bmatrix} \frac{\text{iq\_ref}}{\text{iq\_aq}} & 0 \\ 0 & 1 \end{bmatrix} \left\{ \begin{bmatrix} \text{vd\_ref} \\ \text{vq\_ref} \end{bmatrix} - \begin{bmatrix} Rs & -\omega Lqs \\ \omega Lds & Rs \end{bmatrix} \begin{bmatrix} \text{id\_ad} \\ \text{iq\_ad} \end{bmatrix} - \begin{bmatrix} 0 \\ \omega \Phi fs \end{bmatrix} \right\}$$

(Equation 12)

Figure 11:
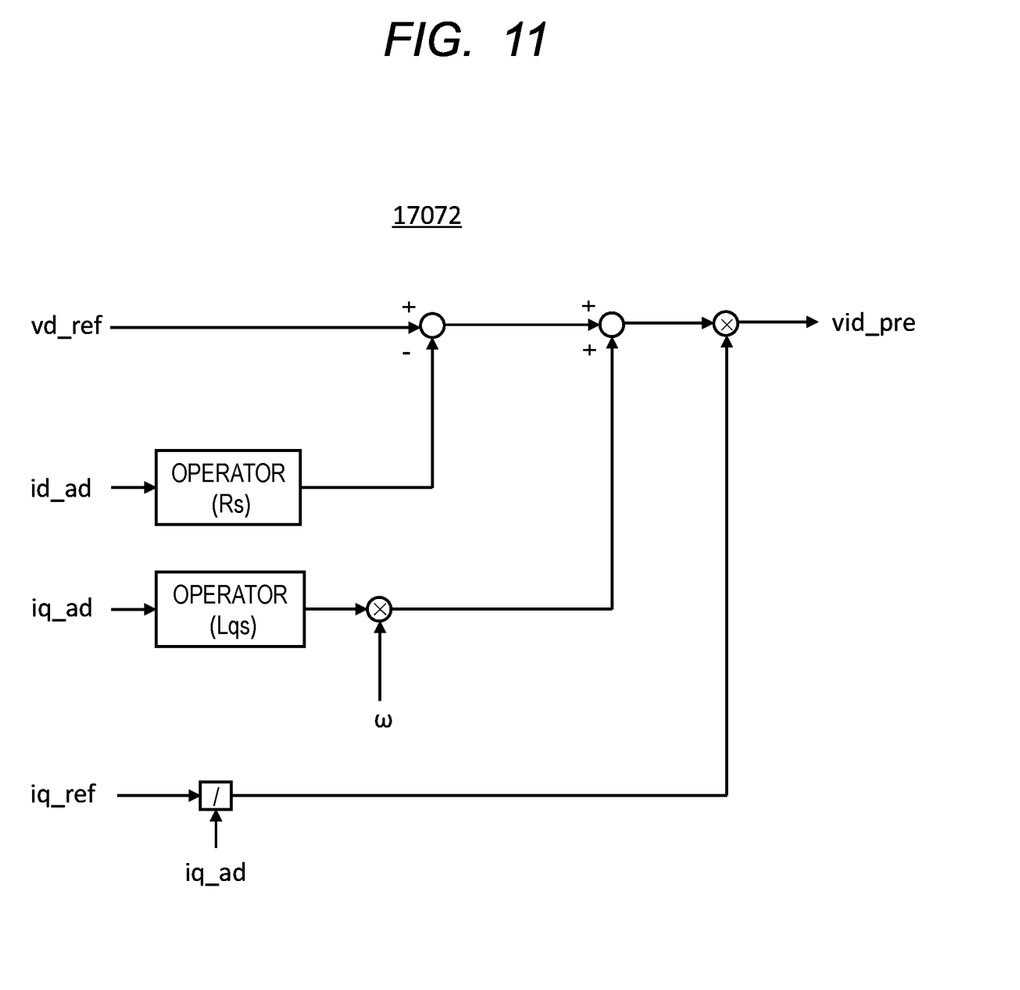
FIG. 11 is a diagram of the integration controller of second embodiment.
Figure 12:
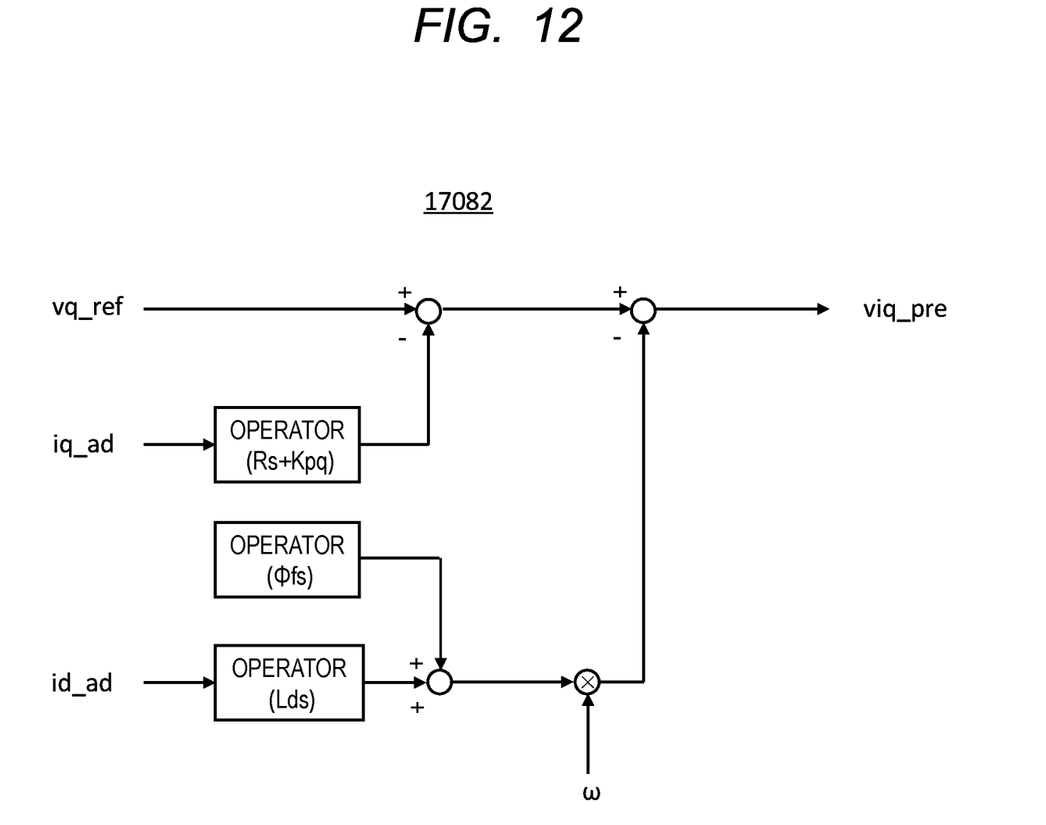
FIG. 12 is a diagram of the integration controller of second embodiment.

FIG. 11 shows an initial voltage vid_pre generator 17072 included in the integration controller 1707. FIG. 12 shows an initial voltage viq_pre generator 17082 included in the integration controller 1708. FIGS. 11 and 12 are based on the equation 12.

In the present second embodiment, the same effects as those of first embodiment can be obtained.

Third Embodiment

Figure 13:
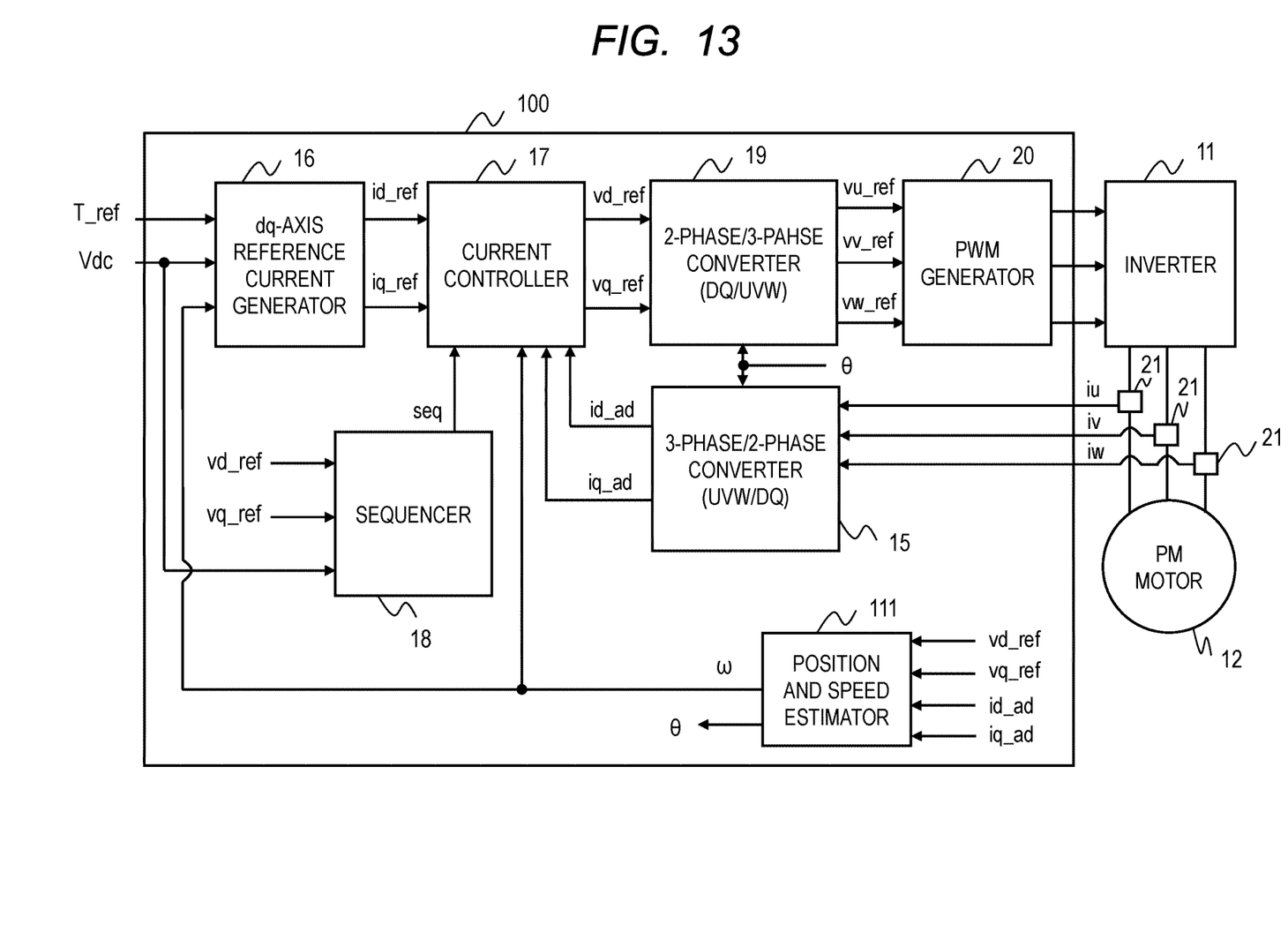
FIG. 13 is a schematic diagram of a motor control system of third embodiment.

FIG. 13 is a block diagram showing the configuration of the motor control system of third embodiment. In first embodiment, the rotational position θ of the PM motor 12 is detected by PS 13. This third embodiment uses a sensorless control scheme that does not use PS 13.

As shown in FIG. 13, semiconductor device 100 includes a position and speed estimator 111 instead of the angular speed detector 14. The position and speed estimator 111 estimations the rotation position θ and turning angular speed ω of the PM motor 12 from the dq-axis reference voltage values vd_ref, vq_ref, and the dq-axis two-phase detected current values id_ad and iq_ad. The components other than the position and speed estimator 111 are the same as those of first embodiment. Since the operation of semiconductor device 100 is the same as that of first embodiment, the explanation thereof is omitted.

In the sensorless control method, there is known a method of estimating the rotational position θ and the rotational angular speed ω of the PM motor 12 by estimating the induced voltage generated in the dq axis of the PM motor 12. The position and speed estimator 111 also employs this estimation method. Details of the estimation method are omitted.

In the third embodiment, the same effects as in first embodiment can be obtained even with a sensorless motor control system.

It should be noted that the present invention is not limited to the above-mentioned embodiments, and various modifications can be made without departing from the gist thereof.

What is claimed is:

1. A semiconductor device for vector control of an AC motor via an inverter, comprising:
   a dq-axis reference current value generator which generates reference current values of the magnetic flux axis (d-axis) and the torque axis (q-axis) based on a reference torque value;
   a three-phase/two-phase converter which generates dq-axis detected current values from three-phase current values detected by a current detector coupled to the inverter and a rotor position of the AC motor;
   a current controller which includes a proportional operator, an integrator, and an integration controller which controls the integrator, and generates dq-axis reference voltage values by proportional control and proportional integral control based on the dq-axis reference current values, the dq-axis detected current values, a rotation angular speed of the AC motor, and a motor parameter setting value;
   a sequencer which switches between the proportional control and the proportional integral control,
   wherein when the sequencer switches from the proportional control to the proportional integral control, the integration controller provides an initial voltage value to the integrator before switching to the proportional integral control, and
   wherein the initial voltage value is determined based on the dq-axis reference current values, the dq-axis detected current values, the rotation angular speed of the AC motor, the motor parameter setting value, and one of a proportional gain set in the proportional operator and the dq-axis reference voltage values.

2. The semiconductor device according to claim 1, wherein the sequencer calculates a modulation factor based on the dq-axis reference voltage values and a direct current bus voltage of the inverter, and switches the proportional control and the proportional integral control based on the modulation factor.

3. The semiconductor device according to claim 1, wherein when the AC motor is at a first rotation speed, the AC motor is controlled by the proportional integral control, and
   wherein when the AC motor is at a second rotation speed higher than the first rotation speed, the AC motor is controlled by the proportional control.

4. The semiconductor device according to claim 1, wherein the initial voltage value has a d-axis initial voltage value and a q-axis initial voltage value,
   wherein the motor parameter setting value has a winding resistance set value and dq-axis inductance set values,
   wherein the proportional gain has dq-axis proportional gains,
   wherein the d-axis initial voltage value is obtained by the following equation:

$\{(Rs+Kpd)^*(id\_ref-id\_ad)-\omega^*Lqs^*(iq\_ref-iq\_ad)\}^*iq\_ref/iq\_ad$ wherein the q-axis initial voltage value is obtained by the following equation:

$\omega^*Lds^*(id\_ref-id\_ad)+(Rs+Kpq)^*(iq\_ref-iq\_ad)$ where Rs is the winding resistance set value, Kpd, Kpg are the dq-axis proportional gains, id_ref, iq_ref are the dq-axis reference current values, id_ad, iq_ad are the dq-axis detected current values, Lds, Lqs are the dq-axis inductance set values, and ω is the rotation angular speed of the AC motor.

5. The semiconductor device according to claim 1,
wherein the initial voltage value has a d-axis initial voltage value and a q-axis initial voltage value,
wherein the motor parameter setting value has a winding resistance set value, dq-aixs inductance set values, and an armature flux linkage,
wherein the d-axis initial voltage value is obtained by the following equation:

$$(vd\_ref - Rs*id\_ad + \omega*Lqs*iq\_ad)*iq\_ref/iq\_ad$$

wherein the q-axis initial voltage value is obtained by the following equation:

$$vq\_ref - \omega*Lds*id\_ad - Rs*iq\_ad - \omega*\Phi fs$$

where vd_ref, vq_ref are the dq-axis reference voltage values, Rs is the winding resistance set value, id_ad, iq_ad are the dq-axis detected current values, iq_ref is the dq-axis reference current value, Lds, Lqs are the dq-axis inductance set values, Φfs is the armature flux linkage set value and ω is the rotation angular speed of the AC motor.

6. The semiconductor device according to claim 1, further comprising:
a position and speed estimator which estimates a rotor position and a rotational angular speed of the AC motor based on the dq-axis reference voltage values and the dq-axis detected current values.

7. A motor control system, comprising:
an AC motor;
an inverter;
a current detector which detects an output current of the inverter; and
a semiconductor device which controls the AC motor via the inverter by a vector control,
wherein the semiconductor device comprises:
a dq-axis reference current value generator which generates reference current values of the magnetic flux axis (d-axis) and the torque axis (q-axis) based on a reference torque value;
a three-phase/two-phase converter which generates dq-axis detected current values from three-phase current values detected by a current detector coupled to the inverter and a rotor position of the AC motor;
a current controller which includes a proportional operator, an integrator, and an integration controller which controls the integrator, and generates dq-axis reference voltage values by proportional control and proportional integral control based on the dq-axis reference current values, the dq-axis detected current values, a rotation angular speed of the AC motor, and a motor parameter setting value;
a sequencer which switches between the proportional control and the proportional integral control,
wherein when the sequencer switches from the proportional control to the proportional integral control, the integration controller provides an initial voltage value to the integrator before switching to the proportional integral control, and
wherein the initial voltage value is determined based on the dq-axis reference current values, the dq-axis detected current values, the rotation angular speed of the AC motor, the motor parameter setting value, and one of a proportional gain set in the proportional operator and the dq-axis reference voltage values.

8. The motor control system according to claim 7,
wherein the sequencer calculates a modulation factor based on the dq-axis reference voltage values and a direct current bus voltage of the inverter, and switches the proportional control and the proportional integral control based on the modulation factor.

9. The motor control system according to claim 7,
wherein when the AC motor is at a first rotation speed, the AC motor is controlled by the proportional integral control, and
wherein when the AC motor is at a second rotation speed higher than the first rotation speed, the AC motor is controlled by the proportional control.

10. The motor control system according to claim 7,
wherein the initial voltage value has a d-axis initial voltage value and a q-axis initial voltage value,
wherein the motor parameter setting value has a winding resistance set value and dq-axis inductance set values,
wherein the proportional gain has dq-axis proportional gains,
wherein the d-axis initial voltage value is obtained by the following equation:

$$\{(Rs+Kpd)*(id\_ref-id\_ad) - \omega*Lqs*(iq\_ref-iq\_ad)\}*iq\_ref/iq\_ad$$

wherein the q-axis initial voltage value is obtained by the following equation:

$$\omega*Lds*(id\_ref-id\_ad) + (Rs+Kpq)*(iq\_ref-iq\_ad)$$

where Rs is the winding resistance set value, Kpd, Kpg are the dq-axis proportional gains, id_ref, iq_ref are the dq-axis reference current values, id_ad, iq_ad are the dq-axis detected current values, Lds, Lqs are the dq-axis inductance set values, and ω is the rotation angular speed of the AC motor.

11. The motor control system according to claim 7,
wherein the initial voltage value has a d-axis initial voltage value and a q-axis initial voltage value,
wherein the motor parameter setting value has a winding resistance set value, dq-aixs inductance set values, and an armature flux linkage,
wherein the d-axis initial voltage value is obtained by the following equation:

$$(vd\_ref - Rs*id\_ad + \omega*Lqs*iq\_ad)*iq\_ref/iq\_ad$$

wherein the q-axis initial voltage value is obtained by the following equation:

$$vq\_ref - \omega*Lds*id\_ad - Rs*iq\_ad - \omega*\Phi fs$$

where vd_ref, vq_ref are the dq-axis reference voltage values, Rs is the winding resistance set value, id_ad, iq_ad are the dq-axis detected current values, iq_ref is the dq-axis reference current value, Lds, Lqs are the dq-axis inductance set values, Φfs is the armature flux linkage set value and ω is the rotation angular speed of the AC motor.

12. The motor control system according to claim 7, further comprising:
a position and speed estimator which estimates a rotor position and a rotational angular speed of the AC motor based on the dq-axis reference voltage values and the dq-axis detected current values.

* * * * *